United States Patent
Purcell et al.

(10) Patent No.: US 7,783,822 B2
(45) Date of Patent: Aug. 24, 2010

(54) SYSTEMS AND METHODS FOR IMPROVING PERFORMANCE OF A ROUTABLE FABRIC

(75) Inventors: Brian T. Purcell, Tomball, TX (US); Melvin K. Benedict, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 132 days.

(21) Appl. No.: 11/828,042

(22) Filed: Jul. 25, 2007

(65) Prior Publication Data

US 2009/0031070 A1    Jan. 29, 2009

(51) Int. Cl.
*G06F 13/00* (2006.01)

(52) U.S. Cl. ............... 710/316; 710/306; 710/317

(58) Field of Classification Search ............ 710/4, 710/26, 31, 305, 306, 312, 314–317; 370/392, 370/466, 467
See application file for complete search history.

(56) References Cited

U.S. PATENT DOCUMENTS

| | | | |
|---|---|---|---|
| 6,513,091 B1 * | 1/2003 | Blackmon et al. ......... | 710/316 |
| 7,047,372 B2 * | 5/2006 | Zeitler et al. ............. | 711/154 |
| 7,143,227 B2 * | 11/2006 | Maine ...................... | 710/306 |
| 7,380,018 B2 * | 5/2008 | Moll ........................ | 709/239 |
| 7,403,525 B2 * | 7/2008 | Sano et al. ................. | 370/392 |
| 2002/0156958 A1 | 10/2002 | Huang | |
| 2005/0034049 A1 * | 2/2005 | Nemawarkar et al. ....... | 714/758 |
| 2006/0136694 A1 * | 6/2006 | Hasbun et al. .............. | 711/173 |
| 2006/0230217 A1 * | 10/2006 | Moll ........................ | 710/312 |
| 2007/0168644 A1 * | 7/2007 | Hummel et al. ............ | 711/207 |
| 2009/0016355 A1 * | 1/2009 | Moyes ................... | 370/395.31 |

FOREIGN PATENT DOCUMENTS

| | | |
|---|---|---|
| EP | 1088272 | 10/2002 |
| KR | 10-1999-0012939 | 2/1999 |
| KR | 10-2001-0088224 | 9/2001 |
| WO | WO 2004/062209 | 7/2004 |

OTHER PUBLICATIONS

Definition of "Adress Space" by Wikipedia.com, undated.*
IOMMU Architectural Specification, Advanced Micro Devices, Inc., Feb. 2007.*

* cited by examiner

*Primary Examiner*—Khanh Dang

(57) ABSTRACT

Systems and methods for improving performance of a rentable fabric are disclosed. In an exemplary embodiment a system may comprise a plurality of compute nodes, a routable fabric, and a plurality of chipsets connected by the routable fabric to the plurality of compute nodes. The chipsets have range registers dynamically directing traffic from any device to any of the plurality of compute nodes over the routable fabric.

26 Claims, 7 Drawing Sheets

SYSTEMS AND METHODS FOR IMPROVING PERFORMANCE OF A ROUTABLE FABRIC

BACKGROUND

Data center environments place a tremendous demand on computing systems (e.g., servers, blades, etc.) to provide significant amounts of I/O bandwidth. A server typically provides the required I/O bandwidth needs by supporting provisions for adding multiple I/O cards/devices (also referred to as "adapters") and/or directly incorporating embedded devices within the server. The embedded devices and/or add-in adapter interfaces are typically, but not limited to, PCI Express, PCI/PCI-X, and HyperTransport. The adapters represent a variety of device classes, including storage (SCSI, SATA, SAS, RAID, backup, etc), networking (Ethernet, ATM), clustering (Infiniband, ServerNet), multimedia (video, audio), and others.

It is oftentimes impractical (e.g., due to reliability, cost, and component yield) to connect many I/O devices directly to a compute node or other processing element due to the large number of component pins that would be required. Processor, chipset, and component vendors have addressed these issues by partitioning the various functions and interfaces (e.g., as computing, memory, and I/O interfaces) into multiple devices. The architecture and partitioning scheme provides a generic and simple way to construct multiple platforms that range from small, simple systems that have one or two components to large systems with one or more instances of each component.

Larger systems (e.g., Opteron-based systems) may include multiple processor cores/sockets, multiple chipset components, and many I/O expansion slots. These systems are designed to optimize the CPU-CPU and CPU-memory bandwidth. Accordingly, most of the compute node's (or processor's) buses/interconnects are dedicated to connect memory, memory controllers, and/or other processors. Depending upon the complexity of the system, one or more processors may either have no additional interfaces available, or a very limited/restricted (perhaps in bandwidth) interface available to connect to the I/O subsystem (or other parts of the compute grid in a multi-compute node environment). This scenario can force the I/O or expansion chipsets ("chipset") to the "corners" or periphery of the processing elements within the compute node.

Another side effect of reduced/limited connectivity between the chipset and the processor/memory elements is that there may be a large disparity between the amount of bandwidth on either side of the protocol translator (or "chipset"). For example, a system configuration may have a chipset component that supports over thirty-two lanes of PCI Express (PCIe), while the chipset to processor/memory interface only has at most eight lanes. Chipset vendors, on behalf of system vendors, have opted to include additional interfaces (e.g., HyperTransport) between the chipset and processor/memory components. The additional interfaces not only provide additional bandwidth, but also provide better balance between the various interfaces (chipsets, protocols, etc). The inclusion of additional interfaces to the chipset can reduce the number of chipset components required for a given design, resulting in cost savings.

Chipsets may have a very different "view" of the nodes (e.g., the processor and memory components). As mentioned previously, the optimization of the CPU-CPU and CPU-memory interconnect may not allow the chipset to be connected directly to each node. Chipset transactions to/from nodes must traverse from one node to another node, until the destination node is reached. Each link between nodes and/or the chipset represents one "hop". From the chipset perspective, different nodes within the compute environment may be a different number of hops away. Nodes that have fewer hops are more "near," whereas nodes with a higher number of hops from the chipset are more "far." System performance is directly related to the amount of active chipset (e.g., I/O) bandwidth and the number of hops that the chipset-to-target-node. The chipset transactions are replicated at each node along the chipset-to-target-node path. The chipset transactions consume bandwidth from each local node's available bandwidth (e.g., memory) and thereby limit the amount of bandwidth of the processor(s) and other devices within that node.

When the chipset supports multiple links into the compute node environment, additional chipset bandwidth is available. Currently planned chipset architectures provide either soft or hard partitioning between the upstream (compute node) interfaces and downstream (compute node, fabric, or I/O) interfaces. Traffic (DMA, interrupts, messages, management/etc) is pinned from a downstream interface to only one upstream interface. This pinning (via software and/or hardware configuration/strapping) of a downstream interface to a single upstream interface may not provide the optimal system performance due to the number of hops particular traffic encounters between the chipset and target node.

The problem is very apparent when the operating system scheduler moves tasks/processes (e.g., drivers, applications) from one node to another within the compute environment. The dynamic movement of these processes can either improve or hinder system performance, depending upon the traffic, profile (e.g., number of hops) of the chipset.

DETAILED DESCRIPTION

It is beneficial to provide an added level of intelligence within the chipset device(s) to route their traffic to the target node using the most direct path (e.g., least number of hops). Providing multiple paths to the CPU complex can reduce the number of hops, thereby reducing or altogether eliminating the replication of data on the CPU buses. Exemplary embodiments increase I/O bandwidth connectivity and utilize all of the available I/O links. This is particularly desirable for high bandwidth devices (e.g., GPUs, 10 Gbps NICs, and RAID adapters).

Exemplary System

Figure 1:
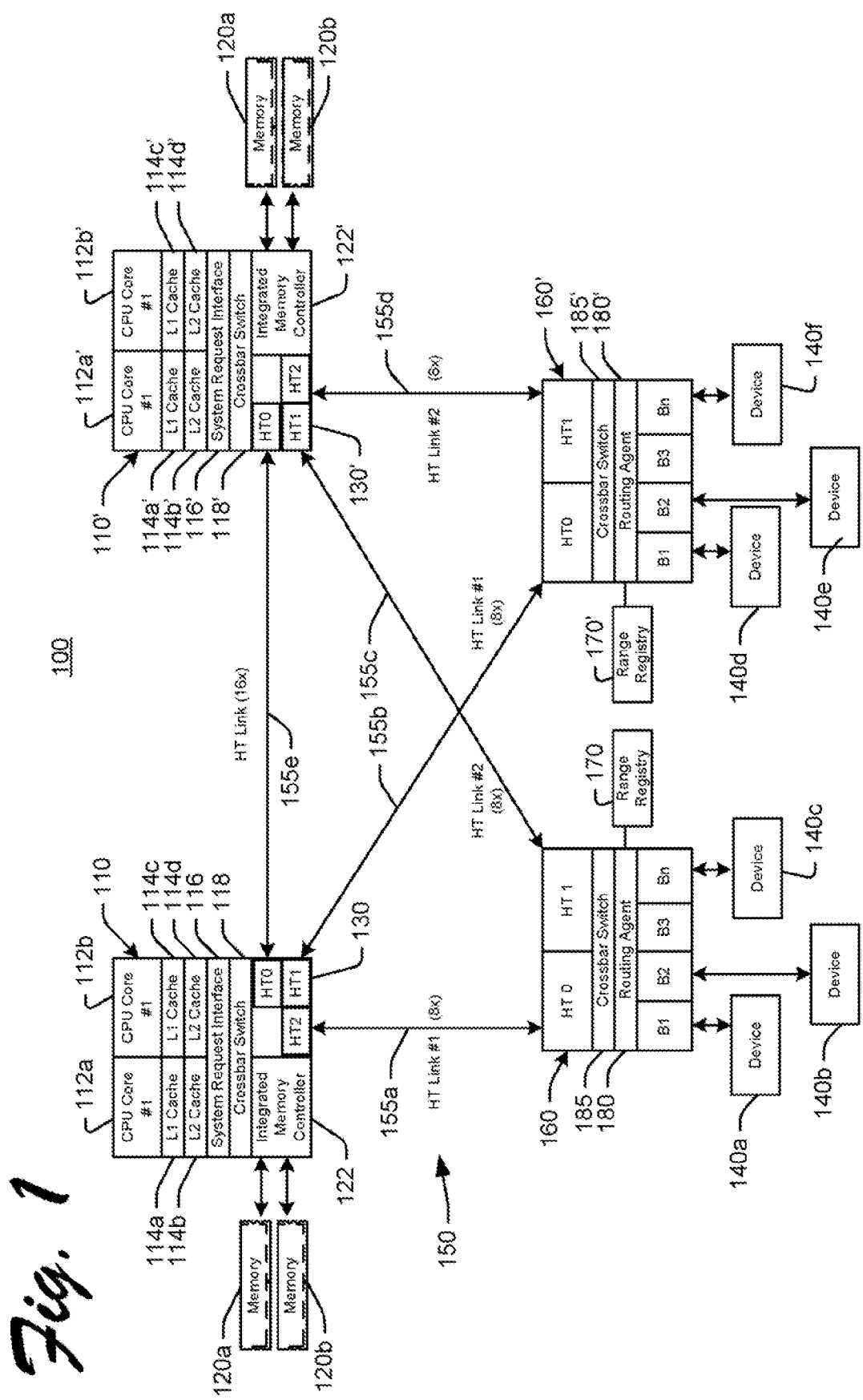
FIG. 1 is a schematic diagram of an exemplary processing system having a mutable fabric.

FIG. 1 is a schematic diagram of an exemplary processing system 100 having a routable fabric 150. In an exemplary embodiment, the processing system 100 may include a plurality of compute nodes 110 and 110'. Compute node 110 may have one or more CPU core 112*a-b*, cache 114*a-d*, and/or system request interface(s) 116. A crossbar switch 118 may be provided to connect the CPU cores 112*a-b* to the shared memory resources 120*a-b* via an integrated memory controller 122. Although not called out herein, like components are also shown in FIG. 1 for compute node 110' and are designated with the "prime" symbol. Of course, more than two compute nodes 110 and 110' may also be provided in processing system 100, as will be readily apparent from the following description.

Each compute node 110 and 110 may also include one or more interfaces to the mutable fabric. In the exemplary embodiment, these interfaces may consist of one or more HyperTransport (HT) interfaces 130 and 130', respectively. Generally, HT interfaces 130 and 130' may include circuitry and program code e.g., firmware) to connect a plurality of devices 140*a-f* (directly or via one or more suitable interconnect translation (e.g., bridge) devices) over the routable fabric 150 to one or more of the compute nodes 110 and 110'. Of course other point-to-point links may also be implemented and are not limited to the HT link (the HT link being only exemplary in this embodiment). The devices may include storage media (e.g., RAID), network interface cards (NICs), multimedia devices, PCIe cards, both embedded and non-embedded devices, and/or other devices now known or later developed.

Any of the devices 140*a-f* may connect via a chipset 160 or 160' over a direct path 155*a-e* through the routable fabric 150 to any of the compute nodes 110 and 110'. Although all of the devices 140*a-f* may simultaneously connect to separate compute nodes 110 and 110' and multiple devices 140*a-f* can connect/communicate across the routable fabric concurrently.

In the exemplary embodiment, devices that connect to the routable fabric may contain one or more logical and/or physical fabric interfaces. A single physical interface may be divided into multiple logical interfaces, each providing unique "ports" or "paths" into the routable fabric. In exemplary embodiments, multiple paths 155*a-e* may be established using Hyper Transport links. The HyperTransport 3.0 specification allows links to be divided (e.g., bifurcated) into multiple, independent connections. This allows a HT-based device with the ability to connect to multiple/other HT devices. For example, a 16× HT link can be split or divided (e.g., bifurcated) into two logical 8× HT links. That is, a single HT port from a processor may be split into logical ports (e.g., HT0, HT1, HT2, etc.) to provide multiple paths 155*a* and 155*b*. Another single HT link from chipset 160' may also be split (e.g., bifurcated) into logical ports HT0 and HT1 to provide paths 155*c* and 155*d*. It is noted that in the exemplary implementation each chipset 160, 160' has two independent HT links. In other embodiments, however, a bifurcated link may be employed. It is noted that the bifurcated HT link is capable of operating as either two 8× HT links or as a single 16× HT link, depending on bandwidth requirements.

Dual HT interfaces enable each chipset 160 and 160' to be connected to both compute nodes 110 and 110' in the 2S design shown in FIG. 1, and traffic to be routed between both compute nodes 110 and 110'. In 4S (see FIG. 3) and 8S (see FIG. 4) designs, bifurcation (and/or multiple HT interfaces) allows use of the same I/O subsystem between the two platforms. For example, in the 4S design, each chipset component connects to two processors via independent 8× links which allows the chipset twice the number of connections to the compute node 110, or allows simultaneous connection between multiple compute nodes 110 and 110'.

It is noted that there are no theoretical limits on the number of paths that can be included in a routable fabric and bifurcation is shown only as an exemplary embodiment. The number of paths is limited primarily by the connectivity implemented in the routable fabric and devices that interface to the routable fabric. It is also noted that the processing system is not limited to 1S, 2S, 4S, or 8S designs, and can also be extended to other processing environments.

It is also noted that bifurcation and dual HT links is described only to illustrate one example of a representative chipset and processor architecture which may be implemented. Other embodiments are also contemplated to allow the chipset to directly connect to 2+ compute nodes (CPUs).

In exemplary embodiments, a range registry 170 may be implemented as a physical registry set up in the interface stack of each chipset 160 and 160' to dynamically direct traffic through the multiple paths 155*a-e* in the routable fabric 150. The BIOS or software may set up the chipset routing tables. For example, the BIOS may provide extensions to a routing table in order to provide a "weighted" view of CPU/memory to chipset and endpoint affinity. This provides a mechanism to tell the OS and software how many hops for a particular I/O device, thereby enabling the OS and drivers to affinitize the I/O device (or compute node) traffic to the other fabric endpoint (DRAM memory or other device) based upon the most direct path.

Additionally, the range registry 170 and associated logic/circuitry directs traffic (DMA requests, messages, etc.) from device ports B1-B*n* to one or more of the fabric interconnect ports 155. The range registry directs the traffic in order to optimize the traffic's path (by minimizing the number of hops).

In an exemplary embodiment, each routing table entry includes a descriptor defining the physical base address, a physical address limit (or aperture size), and configurable access parameters including read, write, prefetch, and write posting. Each routing table entry may also contain a configuration mechanism that associates/ties the descriptor to a specific upstream port. Each descriptor can be routed to one upstream port (but not both). Multiple descriptors are available to allow several address ranges to be mapped between the two upstream ports.

When a bus master (DMA) request occurs, the routing agent 180 first performs virtual to physical address translation if needed. In an exemplary embodiment, the routing agent may be an I/O Memory Mapped Unit (IOMMU). The routing agent (IOMMU) is responsible for virtual to physical address translation and/or security/authentication tasks. The routing agent may also perform virtual-to-virtual address translation, in cases where multiple translations may be required to determine the final physical address. In any event, the translated (if required) address is then compared to the routing table entries to determine which upstream port the cycle should be forwarded to via the crossbar switch 185. The upstream port then forwards the transaction to the routable fabric interconnect 155.

Figure 1A:
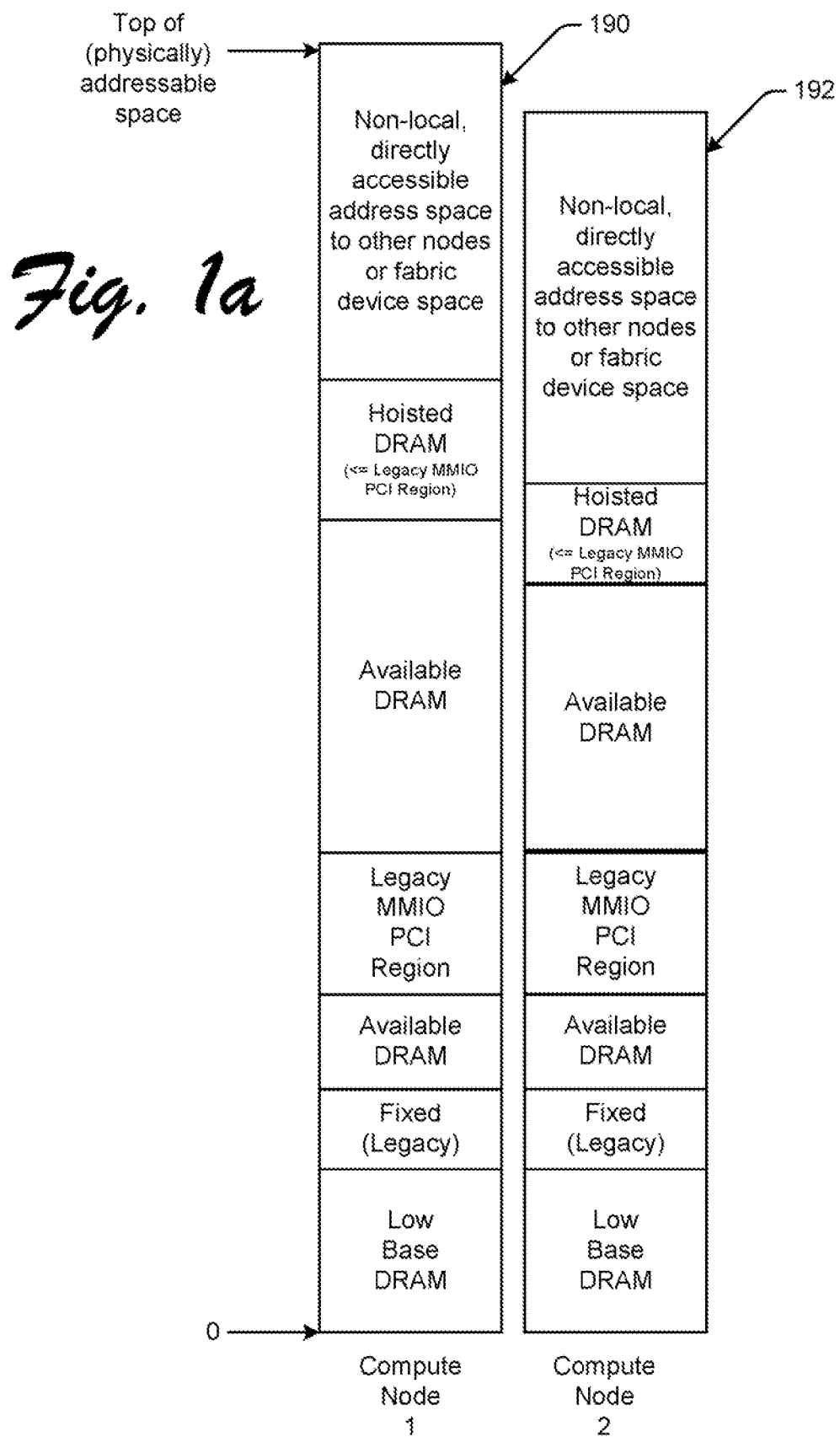
FIG. 1a and 1b illustrate exemplary address translation.
Figure 1B:
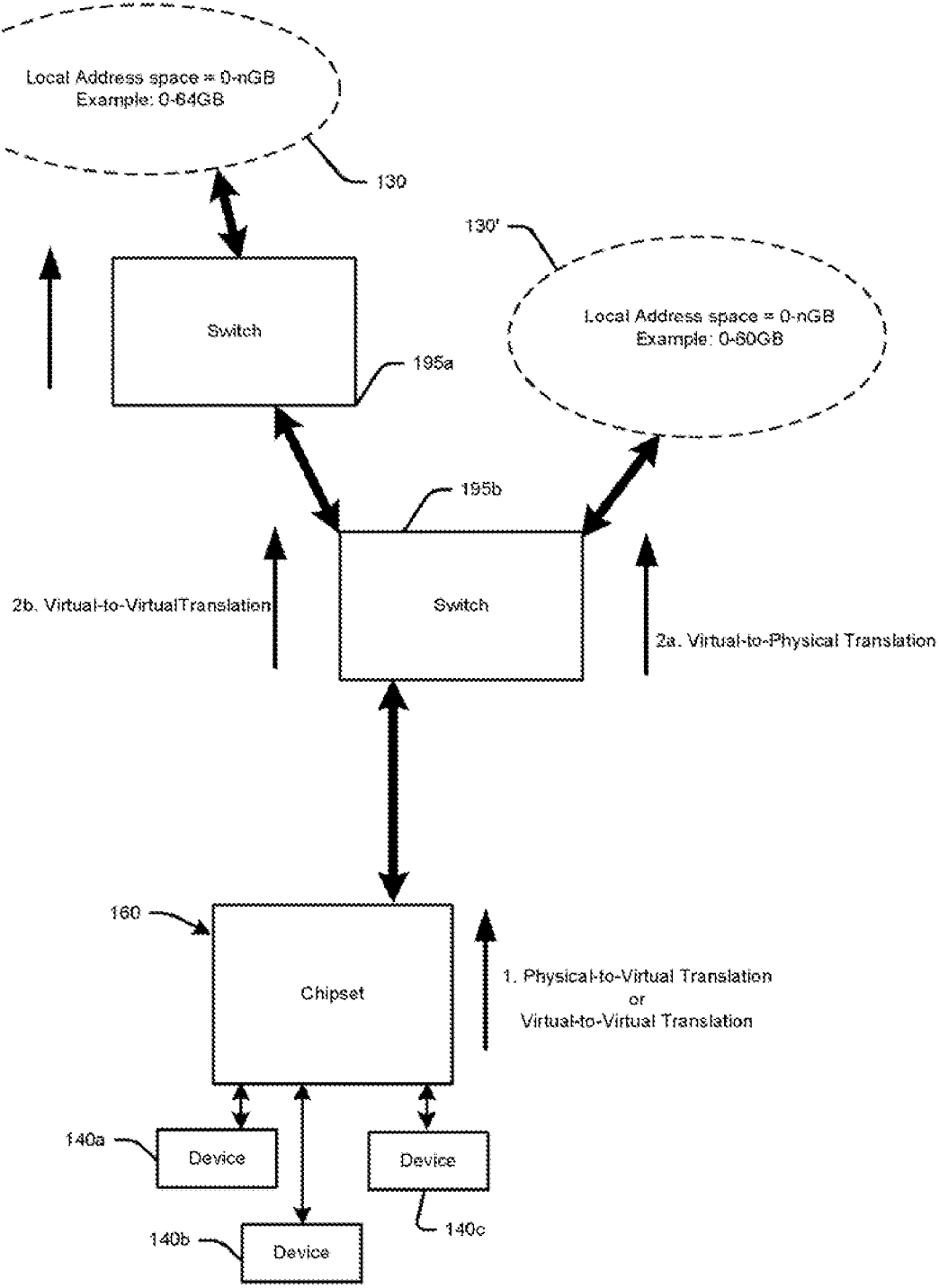

Address translation may be better understood with reference to FIGS. 1*a* and 1*b*. FIG. 1*a* shows an exemplary physical memory map from each compute node's perspective. In this example, memory map 190 corresponds to compute node 1 and memory map 192 corresponds to compute node 2 (although any number of compute nodes may be present). Compute node 1 cannot directly access the memory/resources of compute node 2 without some kind of address translation. Compute node 1 does have the ability to directly access memory at compute node 2 (shown at the top of the addressable space), but some form of address translation is needed to re-map down into the physical range (e.g., available DRAM) at compute node 2.

FIG. 1b shows an exemplary system architecture with two compute nodes (as shown in FIG. 1), each with their own local memory and view of system resources (as shown in FIG. 1a). The switches 195a-b (e.g., HT bridges/switches, PCIe, or other fabric interconnect), serve as a fabric interconnect. The fabric interconnect provides address translation services (if required) and directs traffic to the appropriate ports or paths within the fabric. In the example shown in FIG. 1b, the arrows and text illustrate what type of address translations may occur at the various stages. In this example, only the device 170 (e.g., storage and/or network controller) to target compute node access is detailed.

Before continuing, it is noted that dynamically directing traffic through the multiple paths 155a-e in the routable fabric 150, as just described, is for purposes of illustration and is not intended to be limiting. In addition, other functional components may also be provided and are not limited to those shown and described herein.

It is also noted that the exemplary embodiments described herein are particularly well-suited for use within the PCI configuration space. The configuration space can be accessed via standard PCI configuration cycles, memory-mapped cycles, or other type of messaging or management protocol. Each upstream link (e.g., HT0 and HT1) connects to a unique port on one or more processors (e.g., compute nodes). By common architectural implementations (e.g., PCI based systems), each I/O link contains its own set of unique PCI bus numbers. The integrated devices (e.g., PCI Express bridges, P2P bridges, embedded devices) can be configured ("pinned") to either port, but not both (in order to conform to common software device discovery algorithms). Individual devices must only appear once in the PCI configuration space (unless software/hardware is included to handle devices which would be discovered multiple times by one or more fabric-connected devices). It is noted that each CPU can have a unique PCI configuration routing table to optimize the routing of PCI configuration cycles to the chipset. This allows multiple entry points for configuration cycles (e.g., a PCI configuration cycle to bus 0xYY can enter a device from either routable fabric port, depending on which device initiated/forwarded the configuration cycle), and provides the most direct (eg. shortest) routing path between the initiator and target devices.

In addition, it is noted that the exemplary embodiments described herein allow the entire I/O to be available in all product numbers (or SKUs). In 4S and 8S designs, bifurcation enables use of the same I/O subsystem between the two platforms. For example, the 4S system can be configured as either 2S or 4S (each chipset component connects to two processors via a unique 8× link, enabling full I/O connectivity in either a 2S or 4S configuration). The 8S system can be configured as either 4S or 8S (the first four processors hook to the four chipset components by 8× links and the remaining 4 processors are hooked to the same chipset components via 8× links).

The exemplary embodiments described herein also enable higher concurrency between I/O (chipset) and system memory (i.e., there are more active HT links). All links can be utilized within a system without having to add chipset components.

Furthermore, the average number of "hops" the data takes between I/O (chipset) and system memory 2S design can be reduced if the devices (e.g., chipsets) within the routable fabric direct traffic to the closest and/or most-optimal port. For example, the average number of hops goes from 1.5 to 1.0 (a 33% improvement) in a 2S design. The average number of hops goes from 1.75 to 1.5 (a 14% improvement) in a 4S design. And the average number of hops goes from 1.875 to 1.75 (a 6.7% improvement) in an 8S design, as will be better understood with reference to the illustrations shown in FIGS. 2-4.

Figure 2:
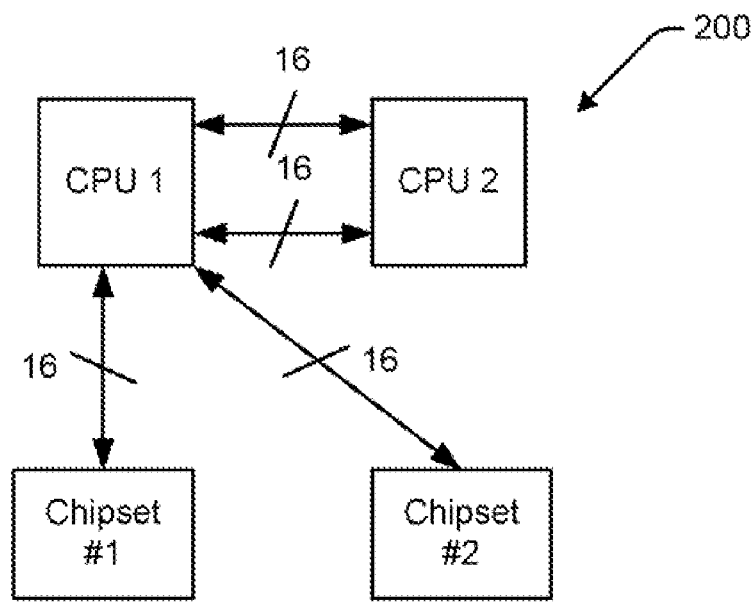
FIG. 2 is a high level diagram of an exemplary 2S design showing improved performance using a bifurcated design in a routable fabric.
Figure 2:
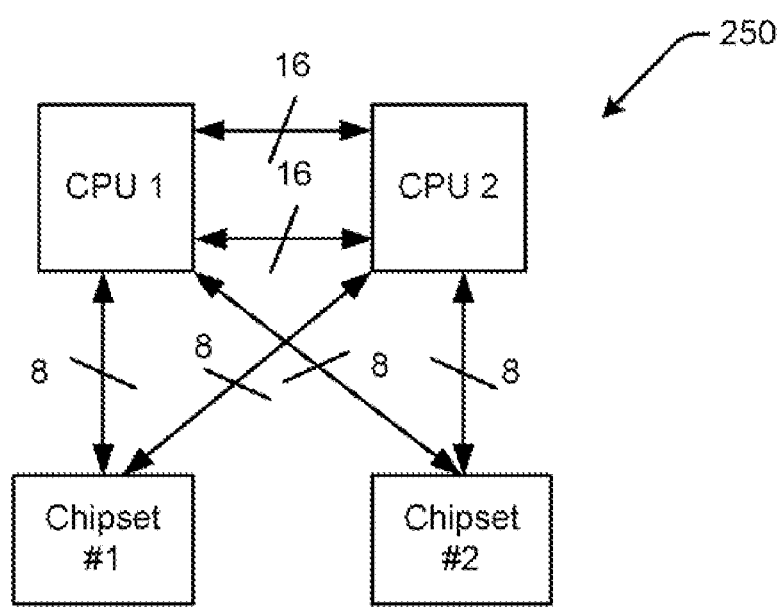

FIG. 2 is a high level diagram of an exemplary 2S design showing improved performance using a bifurcated design in a routable fabric. In a traditional 2S interconnect 200, all I/O is connected to CPU1 via 16× HT links. The crossbar capabilities of CPU socket 2 are not fully realized, and an average 1.5 hops from the chipset are required to reach the memory resources at either of the CPUs.

In a bifurcated 2S design 250, however, each processor is connected to a chipset, via an 8× HT link. All I/O is available in both the 1S and 2S configurations, and I/O is balanced across all crossbars. Accordingly, an average 1.0 hops are required to reach the memory resources at either of the CPUs, resulting in a 33% reduction in number of hops as compared to the traditional 2S interconnect 200.

Figure 3:
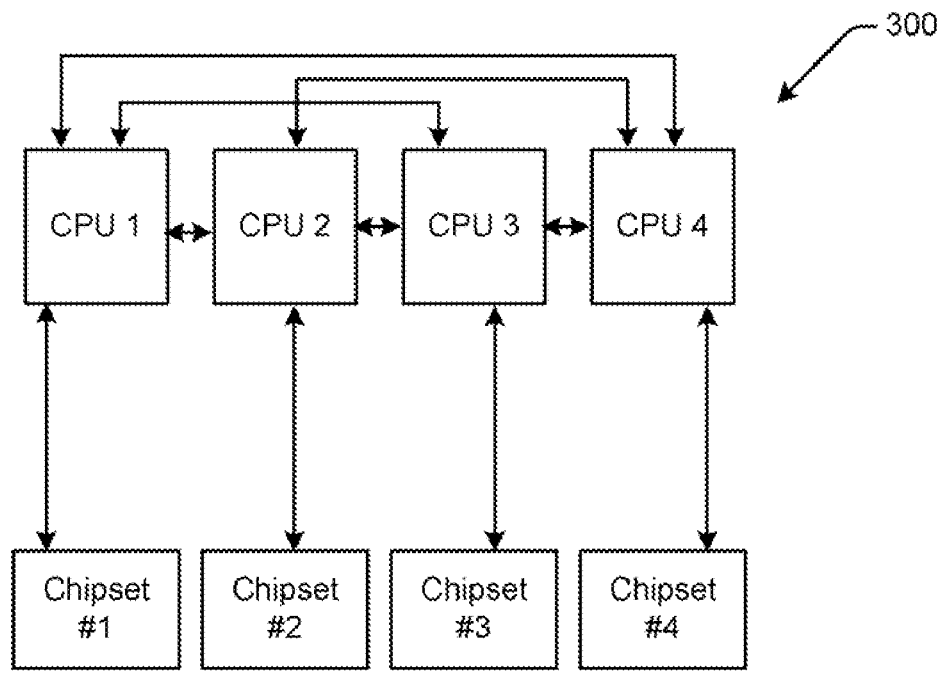
FIG. 3 is a high level diagram of an exemplary 4S design showing improved performance using a bifurcated design in a routable fabric.
Figure 3:
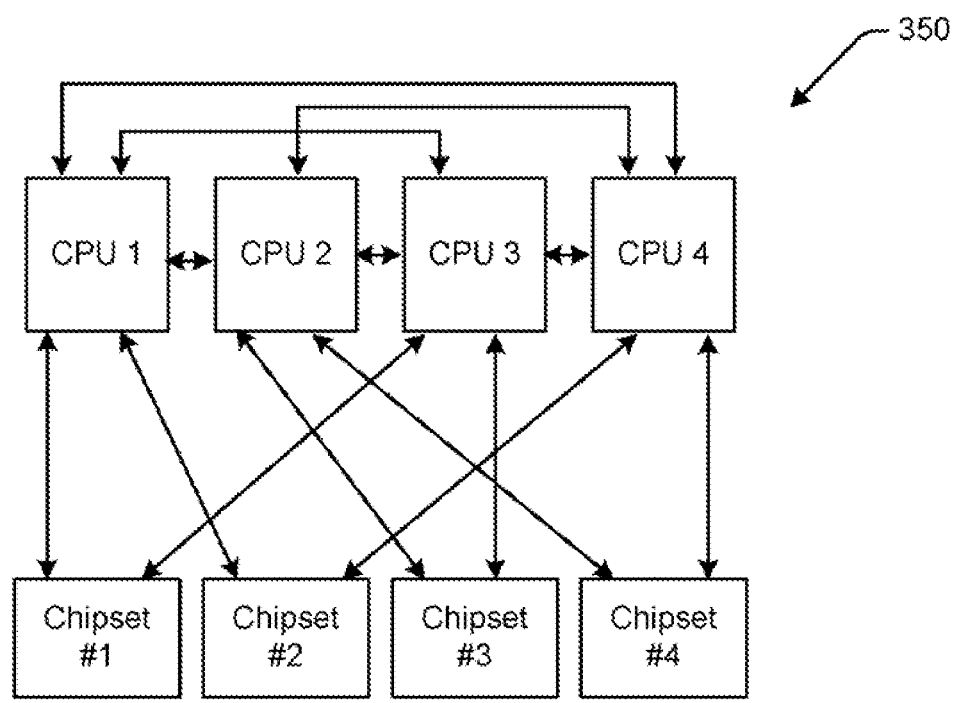

FIG. 3 is a high level diagram of an exemplary 4S design showing improved performance using a bifurcated design in a routable fabric, in a traditional 4S interconnect 300, all I/O is connected to CPU1 via 16× HT links, and all CPUs are interconnected via 16× HT links. An average 1.75 hops from the chipset are required to reach the memory resources at either of the CPUs.

In a bifurcated 4S design 350, however, each processor is connected to a chipset via an 8× HT link, and all CPUs are interconnected via 16× HT links. All I/O is available in both the 2S and 4S configurations, and I/O is balanced across all crossbars. Accordingly, an average 1.5 hops are required to reach the memory resources at either of the CPUs, resulting in a 14% reduction in number of hops as compared to the traditional 4S interconnect 300.

Figure 4:
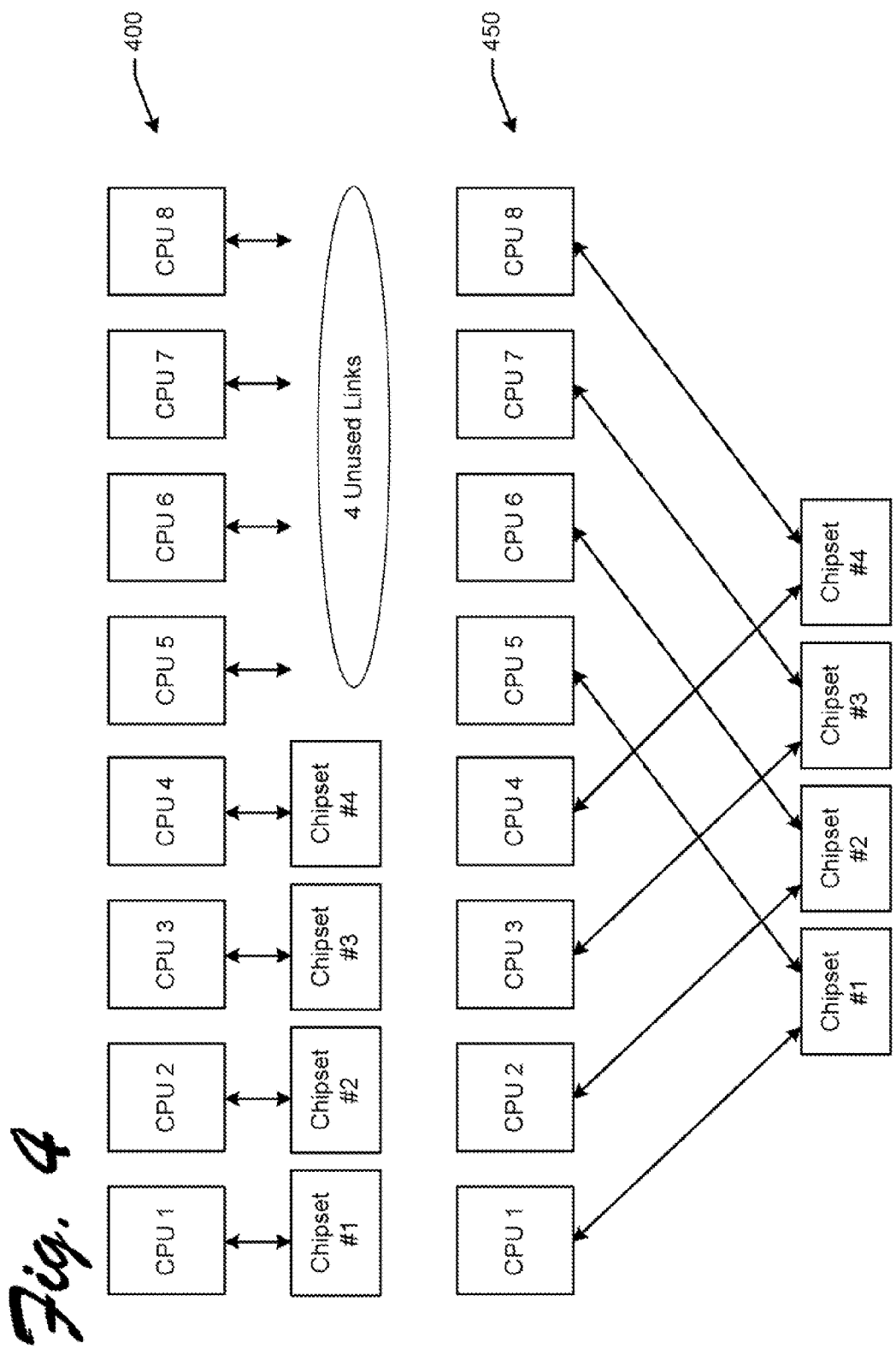
FIG. 4 is a high level diagram of an exemplary 8S design showing improved performance using a bifurcated design in a routable fabric.

FIG. 4 is a high level diagram of an exemplary 8S design showing improved performance using a bifurcated design in a routable fabric. In a traditional 8S interconnect 400, all I/O is connected to CPU1 via 8× HT links, and all CPUs are interconnected via 8× HT links. However, only 50% of the HT bandwidth is available to the I/O compared to a traditional 4S design. That is, there are four unused HT links (CPU5-CPU8). An average 1.875 hops from the chipset are required to reach the memory resources at either of the CPUs.

In a bifurcated 8S design 450, however, each processor is connected to a chipset via an 8× HT link, and all CPUs are interconnected via 8× HT links. The full I/O subsystem is available in both the 4S and 8S configurations, and all HT links are used (i.e., there are 8 links to the I/O). Accordingly, an average 1.75 hops are required to reach the memory resources at either of the CPUs, resulting in a 6.7% reduction in number of hops as compared to the traditional 8S interconnect 400.

It is noted that the exemplary systems discussed above are provided for purposes of illustration. Still other implementations are also contemplated.

Exemplary Operations

Figure 5:
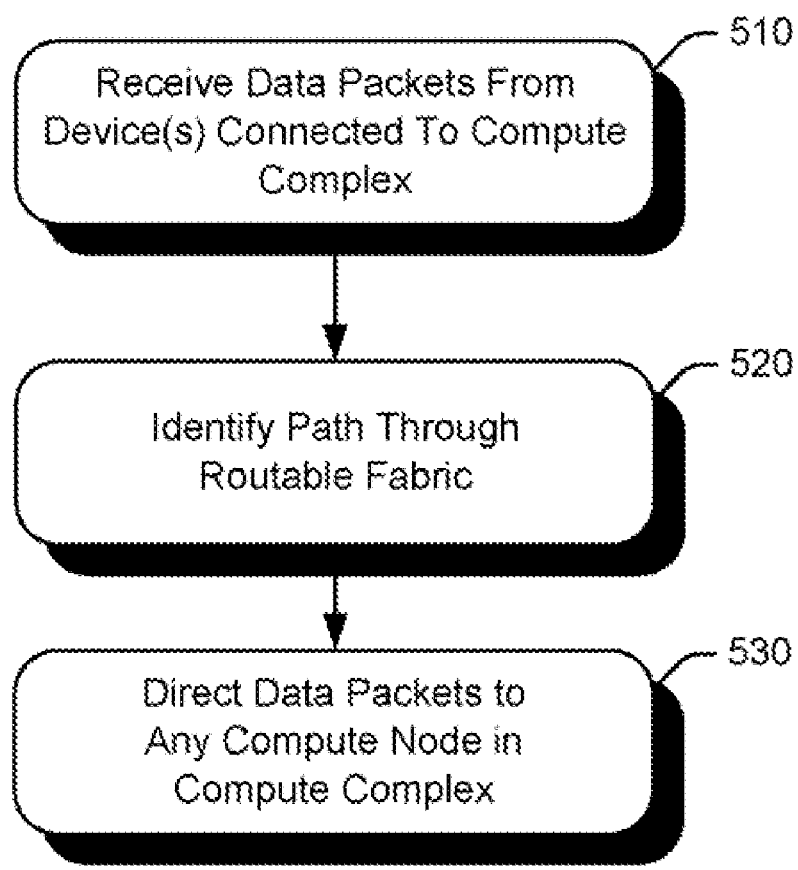
FIG. 5 is a flowchart illustrating exemplary operations for improving performance of a routable fabric.

FIG. 5 is a flowchart illustrating exemplary operations for improving performance of a routable fabric. Operations 500 may be embodied as logic and/or logic instructions on one or more computer-readable medium. When executed the logic instructions cause one or more devices to be programmed for implementing the described operations. In an exemplary embodiment, the components and connections depicted in the figures may be used to improve performance of a routable fabric.

In operation 510, data packets (such as, but not limited to, DMA requests, management, configuration, interrupt, and messages) are received from any of a plurality of devices connected to a compute complex. The compute complex may contain any combination of processors, chipsets, memory, routable fabric interfaces, and/or devices. In operation 520, an available path is identified for the data packets through a routable fabric based on data stored in a plurality of range registers. For example, the range registers or virtualization agent (e.g., IOMMU) may be implemented to translate addresses of the data packets to identify the most efficient and/or direct path through the routable fabric. In operation 530, the data packets are dynamically directed to any of a plurality of compute nodes in the compute complex.

Dynamically directing the data packets to any of a plurality of compute nodes in the compute complex reduces the number of CPU-CPU or CPU-I/O hops. Dynamically directing the data packets to any of a plurality of compute nodes in the compute complex also reduces data replication on CPU buses. This also allows the scalability/extendibility/expandability of the fabric to include multiple compute nodes.

The operations shown and described herein are provided to illustrate exemplary embodiments for improving performance of a routable fabric. It is noted that the operations are not limited to the ordering shown and described. In addition, still other operations may also be implemented.

By way of example, operations may implement physical-to-virtual, physical-to-physical, and/or virtual-to-virtual address translation (e.g., based on data stored in the range registers and/or virtualization agent such as the IOMMU). The translation features may be handled by one or more I/O Memory Management Units (IOMMUs) utilizing IOMMU entries. The initial translation services and access privileges (e.g., security) is performed by the IOMMU. The translated address (either virtual to physical, or virtual to virtual) is sent to the appropriate "fabric port" based upon the resulting translated address.

In addition to the specific embodiments explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A system comprising:
   a plurality of compute nodes;
   a routable fabric; and
   a plurality of chipsets separate and external to the plurality of compute nodes, the plurality of chipsets connected by the routable fabric to the plurality of compute nodes, the chipsets having range registers dynamically directing traffic from any device external to the plurality of chipsets to any of the plurality of compute nodes over the routable fabric via multiple independent connections directly from the chipsets to the computer nodes.

2. The system of claim 1 further comprising at least one table and logic to translate physical addresses for directing traffic from any device to any of the plurality of compute nodes over the routable fabric.

3. The system of claim 1 further comprising at least one table and logic to translate virtual addresses for directing traffic from any device to any of the plurality of compute nodes over the routable fabric.

4. The system of claim 1 wherein the routable fabric includes a point-to-point link links.

5. The system of claim 1 wherein the routable fabric includes HyperTransport (HT) links.

6. The system of claim 5 wherein the routable fabric includes split HyperTransport (HT) links.

7. The system of claim 6 wherein the split HT links are bifurcated wherein:
   each compute node is connected to a chipset via an 8× HT link and all I/O is available in both 1S and 2S configurations and I/O is balanced across all crossbars resulting in a 33% reduction in number of hops as compared to a traditional 2S interconnect;
   each compute node is connected to a chipset via an 8× HT link and each compute node is interconnected via 16× HT links, and all I/O is available in both 2S and 4S configurations and I/O is balanced across all crossbars resulting in a 14% reduction in number of hops as compared to a traditional 4S interconnect; and
   each compute node is connected to a chipset via an 8× HT link and each compute node is interconnected via 8× HT links, and all I/O is available in both 4S and 8S configurations and all HT links are used resulting in a 6.7% reduction in number of hops as compared to a traditional 8S interconnect.

8. The system of claim 1 wherein the plurality of chipsets include bridges.

9. The system of claim 8 wherein the plurality of bridges include at least one of the following: PCI controllers, PCIe controllers, storage controllers, video controllers, audio controllers, I/O Memory Management Units (IOMMUs) and network interface controllers.

10. The system of claim 1 wherein the plurality of chipsets include endpoint devices.

11. The system of claim 10 wherein the endpoint devices include at least one of the following: an add-in adapter or embedded component.

12. The system of claim 10 wherein the endpoint devices include at least one of the following: storage media, network controllers, storage devices, video devices, and audio devices.

13. A method for improving performance of a routable fabric, comprising:
   receiving data packets from any of a plurality of devices connected to a compute complex;
   identifying an available path for the data packets through a routable fabric based on data stored in a plurality of range registers; and
   dynamically directing the data packets to any of a plurality of compute nodes in the compute complex via multiple independent connections directly from chipsets to the compute nodes, wherein the chipsets are separate and external to the plurality of compute nodes and the plurality of devices are external to the plurality of chipsets.

14. The method of claim 13 further comprising translating physical addresses of the data packets using the range registers before identifying an available path through the routable fabric.

15. The method of claim 13 further comprising translating virtual addresses of the data packets using the range registers before identifying an available path through the routable fabric.

16. The method of claim 13 wherein dynamically directing the data packets to any of a plurality of compute, nodes in the compute complex reduces the number of CPU-CPU or CPU-I/O hops.

17. The method of claim 16 wherein reducing the number of CPU-CPU or CPU-I/O hops reduces data replication on CPU buses.

18. The method of claim 16 wherein the routable fabric includes a split point-to-point link.

19. The method of claim 16 wherein the routable fabric includes point-to-point links.

20. The method of claim 16 wherein the split point-to-point link is a bifurcated HT link wherein:
   each compute node is connected to a chipset via an 8× HT link and all I/O is available in both 1S and 2S configurations and I/O is balanced across all crossbars resulting in a 33% reduction in number of hops as compared to a traditional 2S interconnect;
   each compute node is connected to a chipset via an 8× HT link and each compute node is interconnected via 16× HT links, and all I/O is available in both 2S and 4S configurations and I/O is balanced across all crossbars resulting in a 14% reduction in number of hops as compared to a traditional 4S interconnect; and
   each compute node is connected to a chipset via an 8× HT link and each compute node is interconnected via 8× HT links, and all I/O is available in both 4S and 8S configurations and all HT links are used resulting in a 6.7% reduction in number of hops as compared to a traditional 8S interconnect.

21. A system for improving performance of a routable fabric, comprising:
   translation means for identifying an available path through a routable fabric for data packets from any of a plurality of devices connected to a compute complex; and
   traffic directing means for routing the data packets on the available path identified by the translation means through the routable fabric to any of a plurality of compute nodes in the compute complex via multiple independent connections directly from chipsets to the compute nodes, wherein the chipsets are separate and external to the plurality of compute nodes and the plurality of devices are external to the plurality of chipsets.

22. The system of claim 21 wherein the translation means reduces the number of CPU-CPU or CPU-I/O hops to reduce data replication on CPU buses.

23. The system of claim 21 wherein the translation means translates virtual addresses to physical addresses, the translation means using IOMMU entries and then sending the translated address to an appropriate port in the routable fabric based on the translated address.

24. The system of claim 21 wherein the translation means translates virtual addresses to virtual addresses, the translation means using IOMMU entries and then sending the translated address to an appropriate port in the routable fabric based on the translated address.

25. The system of claim 21 wherein the translation means translates virtual addresses when multiple compute nodes are present.

26. The system of claim 25 wherein the multiple compute nodes have localized views of overlapping memory.

* * * * *

UNITED STATES PATENT AND TRADEMARK OFFICE
CERTIFICATE OF CORRECTION

| | | |
|---|---|---|
| PATENT NO. | : 7,783,822 B2 | Page 1 of 1 |
| APPLICATION NO. | : 11/828042 | |
| DATED | : August 24, 2010 | |
| INVENTOR(S) | : Brian T. Purcell et al. | |

It is certified that error appears in the above-identified patent and that said Letters Patent is hereby corrected as shown below:

In column 7, line 59, in Claim 1, delete "computer" and insert -- compute --, therefor.

In column 8, line 65, in Claim 16, delete "compute," and insert -- compute --, therefor.

Signed and Sealed this

Thirtieth Day of November, 2010

David J. Kappos
*Director of the United States Patent and Trademark Office*